No. 831,489. PATENTED SEPT. 18, 1906.
J. A. THOMAS.
DENTAL DISK HOLDER.
APPLICATION FILED JAN. 2, 1906.
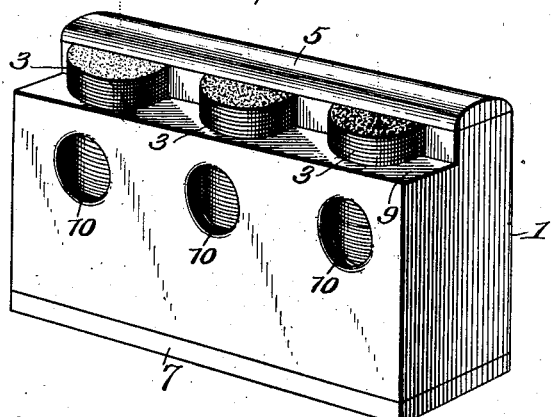
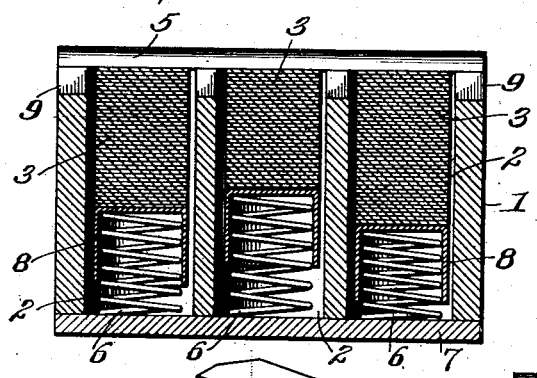
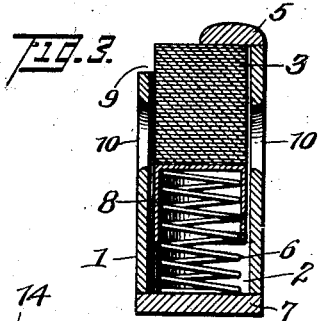
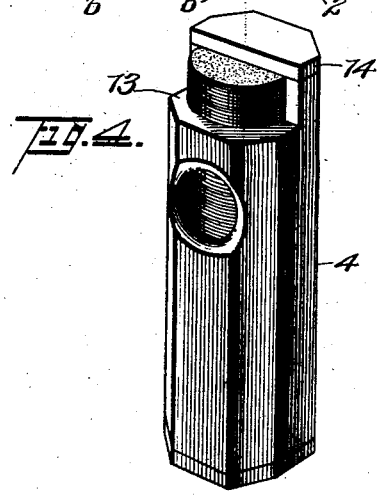
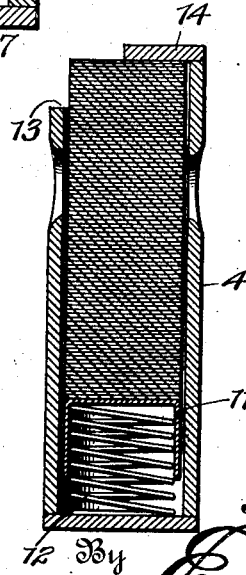
Witnesses
Inventor
Jacob A. Thomas
By
Attorney

UNITED STATES PATENT OFFICE.

JACOB A. THOMAS, OF HANOVER, PENNSYLVANIA.

DENTAL DISK-HOLDER.

No. 831,489.

Specification of Letters Patent.

Patented Sept. 18, 1906.

Application filed January 2, 1906. Serial No. 294,141.

*To all whom it may concern:*

Be it known that I, JACOB A. THOMAS, a citizen of the United States, residing at Hanover, in the county of York and State of Pennsylvania, have invented a new and useful Dental Disk-Holder, of which the following is a specification.

The invention relates to improvements in dental disk-holders.
The object of the present invention is to improve the construction of dental diskholders and to increase the efficiency of the same and to provide a simple and comparatively inexpensive device adapted to keep the disks together and to hold each size and grit separate and capable of enabling the same to be conveniently removed from it.

A further object of the invention is to provide a disk-holder of this character which will effectually prevent all liability of the disks warping, so that each disk removed from it will run perfectly true and not accidentally cut out a filling or cut off more tooth than is desired. Also the invention has for its object to provide a disk-holder which when empty may be conveniently refilled without separating any of its parts.

With these and other objects in view the invention consists in the construction and novel combination and arrangement of parts hereinafter fully described, illustrated in the accompanying drawings, and pointed out in the claim hereto appendéd, it being understood that various changes in the form, proportion, size, and minor details of construction within the scope of the claim may be resorted to without departing from the spirit or sacrificing any of the advantages of the invention.
In the drawings, Figure 1 is a perspective view of a disk-holder constructed in accordance with this invention. Fig. 2 is a longitudinal sectional view of the same. Fig. 3 is a transverse sectional view. Fig. 4 is a perspective view of a disk-holder constructed for holding only one kind of disk. Fig. 5 is a longitudinal sectional view of the same.

Like numerals of reference designate corresponding parts in all the figures of the drawings.

1 designates a casing designed for holding a plurality of different disks and adapted to be constructed of wood, metal, or any other suitable material. The casing 1 is oblong and is provided at intervals with chambers 2 for the reception of disks 3; but an octagonal casing 4, such as is shown in Fig. 4 of the drawings, or any other desired shape may be employed, as will be readily understood.

The casing may be of any desired size and may be provided with any desired number of disk-receiving chambers for holding the various kinds of disks, and they may vary in diameter to accommodate disks of different sizes, and they are adapted to receive disks having various kinds of grit employed in dentistry.

The device is also applicable for holding disks for any other desired purpose.

The disks 3 are held against the top 5 of the casing by coiled springs 6, which are seated upon the bottom 7 of the casing and which have their upper portions arranged within cylindrical followers 8, constructed of sheet metal or other suitable material and fitting flat against the lower disks of the series, as clearly shown in Figs. 2 and 3 of the drawings. The coiled springs are adapted to hold the disks tightly together and firmly pressed against the top of the casing, so that all liability of the disk warping will be effectually prevented. The disks when removed from the casing will be perfectly true, and there will be no liability of a dentist when operating between two teeth of accidentally cutting out a filling or cutting off more tooth than is desired.

The disks are arranged with their abrasive faces uppermost, and the top of the casing is cut away at 9 to expose approximately one-half of the top disks and to provide a projecting cap which fits over the other half of the top disks and coöperates with the spring-actuated followers for clamping the disks firmly together. The abrasive material is arranged on the exterior of the top disks to enable a disk to be readily removed, and in order to facilitate the removal of the disks from the holder the casing is provided at opposite sides of each chamber with openings 10 of a size to permit the fingers to grasp the disks or the follower.

By grasping either the disks or the follower at the openings 10 the coiled spring may be slightly compressed, and the outer disk will thereby be relieved of the pressure of the spring and may be easily and quickly removed from the holder. As soon as the disks or the follower is released the former will be again subjected to the pressure of the spring and will be firmly clamped together. The casing is preferably beveled at the openings to facilitate grasping the disks, and as these openings are of less diameter than the disks they will not cause any displacement of the same. The openings, which are of a size to permit a plurality of disks to be simultaneously introduced into the casing, also enable the holder to be readily filled or refilled, as the spring may be held compressed while the disks are introduced into the holder at the open side of the top.

In Figs. 4 and 5 of the drawings is illustrated a casing having a single chamber for the reception of disks which are engaged by a spring-actuated follower 11, constructed of sheet metal or other suitable material and receiving a coiled spring 12. The top of the casing is cut away at 13 to expose approximately one half of the top disks to provide a projecting cap 14 for engaging the other half of the disks.

It will be seen that the disk-holder is exceedingly simple and inexpensive in construction, that it is adapted to exert spring-pressure on the disks until the last one is removed from the holder, and that the spring-pressure not only holds the disks together, but maintains them perfectly true and effectually prevents all liability of the disks warping and running untrue when used. Also it will be clear that the disks are maintained in a sanitary condition, that they may be quickly and conveniently removed from the holder, and that the latter may be readily refilled without separating any of the parts of the device.

Having thus described my invention, what I claim as new, and desire to secure by Letters Patent, is—

A disk-holder comprising a casing provided with one or more disk-receiving chambers and having its top open at one side to expose approximately one half of the top disks and to provide an opening through which a plurality of disks may be introduced for filling the holder, said casing being provided at the opposite side with a projecting cap for engaging the other half of the top disks, and a spring-actuated follower located within the casing for clamping the disks against the cap, said casing being also provided at an intermediate point of its length with finger-openings arranged diametrically opposite each other and of a size to permit either the disks or the follower to be directly grasped for withdrawing the follower and thereby relieving the pressure on the top disks so as to permit the removal of a disk without affecting its abrading-surface and also enable the disk-holder to be filled.

In testimony that I claim the foregoing as my own I have hereto affixed my signature in the presence of two witnesses.

JACOB A. THOMAS.

Witnesses:
H. M. BANGE,
GUY W. BANGE.